(12) United States Patent
Barenz et al.

(10) Patent No.: US 6,724,470 B2
(45) Date of Patent: Apr. 20, 2004

(54) LASER ASSEMBLY FOR LADAR IN MISSILES

(75) Inventors: Joachim Barenz, Uhldingen (DE); Frank Imkenberg, Überlingen (DE); Hans-Dieter Tholl, Uhldingen (DE)

(73) Assignee: Bodenseewerk Gerätetechnik GmbH, Überlingen/Bodensee (DE)

( * ) Notice: Subject to any disclaimer, the term of this patent is extended or adjusted under 35 U.S.C. 154(b) by 0 days.

(21) Appl. No.: 10/336,870

(22) Filed: Jan. 6, 2003

(65) Prior Publication Data

US 2003/0202168 A1 Oct. 30, 2003

(30) Foreign Application Priority Data

Jan. 8, 2002 (DE) .......................... 102 00 362

(51) Int. Cl.⁷ .................... G01B 11/26; G01C 3/08; H04B 10/12; F41G 7/00
(52) U.S. Cl. ................. 356/141.1; 356/4.01; 359/341.1; 244/3.16
(58) Field of Search .................. 356/141.1, 4.01, 356/5.01–5.15; 244/3.16; 359/341.1

(56) References Cited

U.S. PATENT DOCUMENTS 5,847,816 A  12/1998 Zediker et al.

FOREIGN PATENT DOCUMENTS

DE  43 06 919 A1  9/1994
DE  197 02 681 C2  8/1998

OTHER PUBLICATIONS

"All–solid–state neodymium–based single–frequency master–oscillator fiber power–amplifier system emitting 5.5 W of radiation at 1064 nm" H. Zellner, et al., 1999 Optical Society of America, 3 pages;.
"Single–frequency master–oscillator fiber power amplifier system emitting 20 W of power" S. Höfer, et al., 2001 Optical Society of America, 3 pages;.
"Diode–Pumped Miniature Solid–State Lasers" S. Heinemann, et al., Laser and Optoelecktronik, pp. 48–55.

Primary Examiner—Stephen C. Buczinski
(74) Attorney, Agent, or Firm—Scully, Scott, Murphy & Presser

(57) ABSTRACT

A device for generating a laser beam in a LADAR system has a master oscillator with a laser-active medium and an amplifier stage in the form of a fiber optic power amplifier. This power amplifier amplifies the power of the oscillator. A carrier body is provided, on which a length of fiber of the power amplifier is coiled. The carrier body consists of a material of high thermal conductivity. The master oscillator may be a microchip laser. Diode lasers are used as pump light sources for the fiber optic power amplifier. This assembly can be made lightweight and compact, whereby it is particularly suitable for use in missiles.

35 Claims, 4 Drawing Sheets

LASER ASSEMBLY FOR LADAR IN MISSILES

BACKGROUND OF THE INVENTION

The invention relates to a device for generating a laser beam in a LADAR system for use in a target tracking missile.

A LADAR operates similar to a RADAR. Instead of microwaves used in a RADAR, LADAR uses laser radiation at shorter wavelengths such as infrared or visible light. Accordingly, LADAR permits higher resolution both with respect to distance and with respect to angle than RADAR. Thereby, a profile of a target can be scanned. Such profile measurement, better recognition of the type of target may be possible. Furthermore information about the velocity and the direction of the movement of the target can be obtained from the LADAR signals. Higher pulse rates of pulses emitted by the laser result in higher scanning rates laser and shorter wavelength results in higher resolution.

LADAR systems are used for target seeking and target tracking. The requirements for a LADAR-transmitter used for target seeking and target tracking are very sophisticated. The used laser must have a high pulse frequency and a high pulse energy. The laser parameters, such as amplitude, frequency, phase, polarization and the duration of the emitted pulse must be capable of modulation in order to generate different pulse shapes.

Known laser assemblies for LADAR are based on discrete lasers with a laser resonator comprising mirrors, which have to be adjusted with high precision. The used arrangements are therefore large, heavy and sensitive to vibrations and temperature changes. Furthermore the known laser assemblies require cooling means in order to achieve sufficient pulse energy, the cooling means generally comprising water cooling assemblies. Thereby the assembly will be even larger. With many laser assemblies, the formation of large temperature gradients also prevents high pulse repetition rates to be achieved. However, such high pulse repetition rates and, consequently, high scanning rates are a requirement, if high relative velocities are to be measured.

For these reasons, LADAR, in the current practice, has been used on ground only. The prior art assemblies are not suited for the use in missiles.

Fiber optic lasers are known from telecommunications applications. A fiber optic laser comprises a fiber with a laser-active core and a light guiding periphery: Light from a pump light source is guided into the laser active core, which results in laser activity. Such a fiber optic laser does not require additional water cooling, because it has a high surface-to-volume ratio. An example for such a fiber optic laser is an erbium doted glass fiber.

In U.S. Pat. No. 5,847,816 to Zediker et al. a micro-doppler ladar system for identifying and analyzing a target is described, which makes use of a fiber optic power amplifier for amplification of the radiation from a master oscillator. The ground based LADAR system operates with a coherent transmitter-receiver-assembly and a fiber optic master oscillator.

The use of a fiber optic power amplifier as a preamplifier in the detection path of a Laser-doppler-anemomometer is described in the paper "40 dB fiber optical preamplifier in 1064 nm Doppler anemometer" by Többen, Buschmann, Muller and Dopheide, Electronics Letters 36, p. 1024. The described fiber optics power amplifier amplifies the power of a Nd:YAG-laser, which is a powerful laser by itself.

Furthermore microchip lasers are known. A microchip laser comprises a laser active medium in the form of a very thin plate, whereby a short resonator length is achieved. An example for a microchip laser is described in the data sheet of Leti, CEA/Grenoble, "1,5 $\mu$m passively Q-switched Microchip Lasers" in September 2000. The peak power of such a microchip laser is according to this publication 1–4 kW with pulse widths of about 3 ns. Repetition rates of 1 to 20 kHz can be achieved and the output power is in the order of 30 10–65 mW.

Hellström, Karlsson, Pasiskevicius and Laurell disclose the use of a microchip laser with an additional amplifier on the conference "Advanced Solid-State Lasers 2001" on 28.-31.1 2001 with the title "An optical parametric amplifier based on periodically poled KTi 0 P0$_4$, seeded by an Er—Yb:glass microchip laser". The amplifier used in this case, however, does not operate with a fiber optic power amplifier.

None of the above described lasers is adapted for use in a LADAR system which is suitable for missiles.

DISCLOSURE OF THE INVENTION

It is an object of the invention, to provide a lightweight device for generating a laser beam in a LADAR system.

It is a further object of the invention to provide a device for generating a laser beam, which is insensitive with respect to vibrations and temperature changes.

It is a still further object of the invention to provide a device for generating a laser beam, which is particularly compact and which is therefore suitable for the use in a missile.

It is a further object of the invention to provide a LADAR system with a laser which generates pulses with high energy and a high repetition rate without the need of water cooling.

To achieve these objects, a carrier body of a material with high heat conductivity is provided, on which said fiber optic power amplifier is coiled. With such a carrier a compact arrangement is obtained which is particularly suitable considering the limited space available in seeker heads of missiles. If the carrier body consists of a material with a high heat conductivity the heat losses of the laser can be dissipated through the carrier body. Heat conducting paste, in which the fiber optic power amplifier is embedded, can be used to increase the dissipation of excess heat. The fiber optic power amplifier can also be affixed to the carrier by means of heat conducting glue.

A two-stage arrangement provides the advantage that a laser with comparatively short wavelength and low output power can be used and its light can then be amplified to the required output power. By moving the generation of a high output power to a fiber optic power amplifier a complicated cooling system can be avoided. The remaining heat generated by the laser can be dissipated through the carrier body. As the minimal pulse width of a laser is proportional to the resonator length, very short pulse widths can be realized with accordingly short resonator lengths. A two-stage arrangement with a master oscillator with short resonator length and low output power and a fiber optic power amplifier connected to its output provides short pulses with a high repetition rate and high pulse energy. For modulating the emitted laser pulses only the low-energy master oscillator needs to be modulated.

Therefore the laser assembly is a very simple arrangement and can be realized with small 15 diameters. The master oscillator can be exchanged without changing the power amplifier. Such a laser assembly is suitable for missiles. It has high heat stability and is insensitive to acceleration and vibrations.

The use of a fiber optic power amplifier permits the generation of laser radiation in the 20 eyesafe spectral range with wavelengths which are larger than 1,5 microns, which means that the radiation will not be focused by the human eye.

Preferably the master oscillator is a microchip laser. A microchip laser consists of a thin laser active plate, for example a 1 mm thick erbium: glass plate. These microchip lasers are capable of generating radiation with short wavelengths and have only very small outer diameters. As the radiation power is amplified afterwards their comparatively small radiation power is irrelevant.

Furthermore a diode laser can serve as a pump light source for the fiber optic power amplifier. Diode lasers are small, cheap and easy to handle and they are, therefore, particularly suitable for the use in missiles.

A recess may be provided in the carrier body, in which the diode laser can be arranged. Thereby the assembly will be even more compact. The carrier body may have a further recess in which the pump light source and/or further optical components can be arranged. Preferably the recess can be closed with a cover. Thereby the components arranged in the S recess are protected from damaging influences.

Preferably the carrier body is cylindrical or is prismatic with an elliptical or reniform cross section, a recess being provided for the components in its end faces and the fiber optic is coiled around the circumference. Such a geometry is particularly suitable for the 10 use in missiles, as it contains very small unused spaces only. By developing the geometry of the fiber optic the absorption efficiency in the fiber can be optimized. However, the bending radii of the fibers must not drop below a permissible minimum. Flat surfaces on various sides of the cylinder are also possible.

In a further embodiment of the invention an optical Faraday insulator is provided between the master oscillator and the fiber optic power amplifier. Such an insulator acts like an optical diode. It prevents the backscattering or reflecting of radiation from the amplifier into the master oscillator. Thereby any unwanted laser activity is avoided.

The coupling of the pump radiation into the fiber optic power amplifier preferably is achieved through a dichroitic beam splitter in front of the fiber optic power amplifier. The pump light can be coupled into both ends of the fiber optic power amplifier. A coupling is also possible by means of a fiber optic. In a further modification the fiber optic power amplifier is a double core fiber and the fibers of the pump laser are directly connected with the pump core. Thereby an assembly is provided which is particularly insensitive to vibrations and very compact.

A fiber may be provided for transporting the laser radiation to the transmitter optical arrangement of the LADAR system. In this case the laser assembly can be arranged outside of the seeker head of the missile, where more space is available.

An embodiment of the invention is described below in greater detail with reference to the accompanying drawings.

PREFERRED EMBODIMENTS OF THE INVENTION

Figure 1:
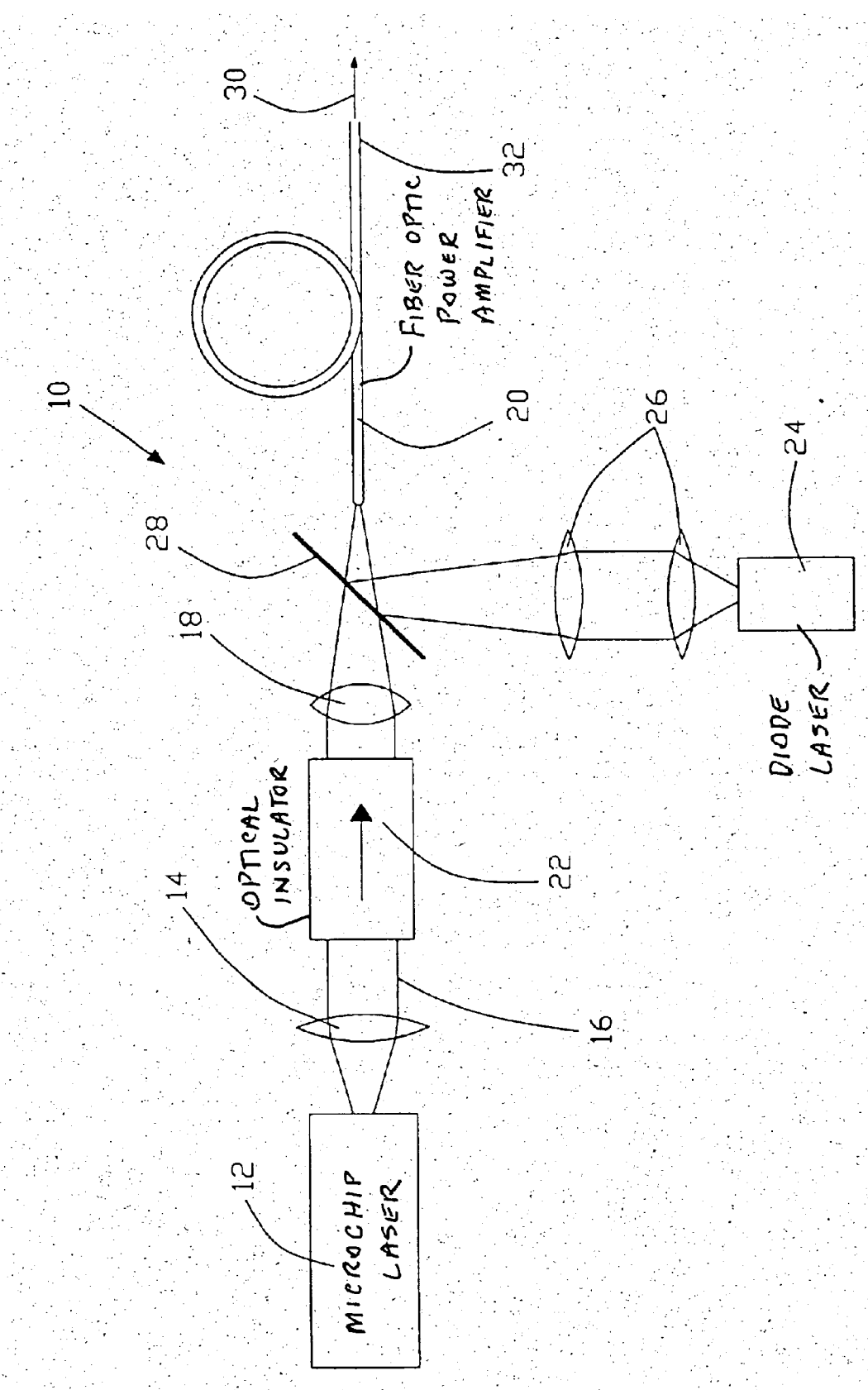
FIG. 1 shows the principle arrangement of a device for generating a laser beam for LADAR-transmitter.

Referring to FIG. 1, numeral 10 designates a two-stage laser for transmitter of a LADAR system, with which the backscattered power can be detected (incoherent LADAR system). The laser 10 is arranged as a so called master oscillator power amplifier (MOPA). The radiation of a microchip laser 12 is collimated with a lens 14 to a parallel beam 16 and coupled into the fiber 20 of a fiber optic power amplifier by a laser-fiber-25 coupling which is shown as a lens 18. The fiber optic power amplifier is a erbium doped fiber amplifier (EDFA). An optical Faraday-insulator 22 is provided between the coupling 18 and the collimating lens 14. The Faraday-insulator 22 has the effect, that radiation ca only pass in the direction of the arrow and not in the opposite direction. Thereby an unwanted excitation of laser emission is avoided. The radiation of a diode laser 24 acting as pump diode is guided into the core of the fiber optic power amplifier 20 by means of an optical arrangement 26 and a dichroitic mirror 28.

The fiber optic power amplifier 20 comprises a coiled length of amplifying fiber with an end 32 where the amplified light emerges.

Figure 2:
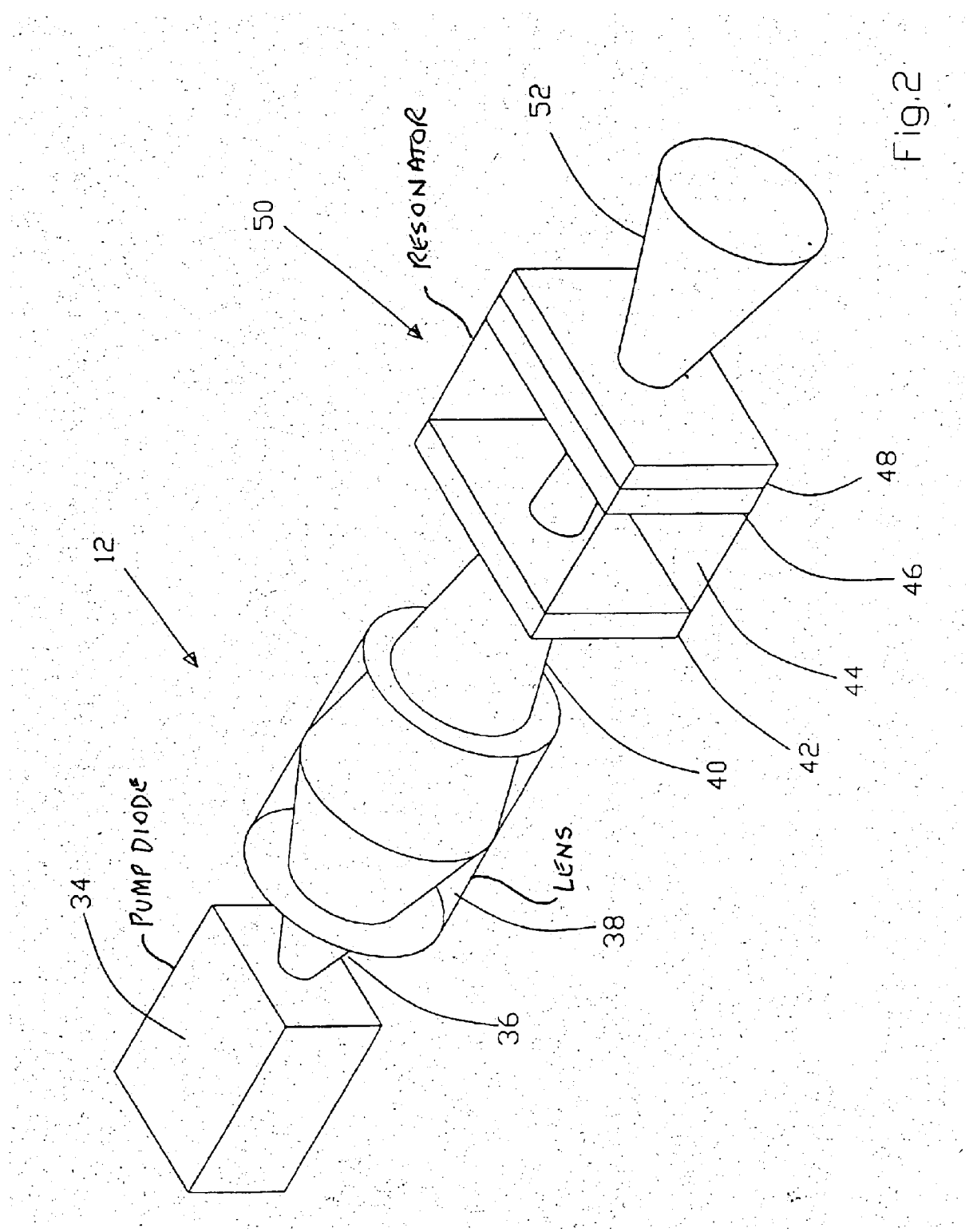
FIG. 2 schematically shows the arrangement of a microchip laser

In FIG. 2 the microchip laser 12 is shown in detail. The microchip laser 12 comprises a 5 pump diode 34 emitting light 36 which is collimated by means of a lens 38. The collimated light 40 is transmitted through the entrance mirror 42 of the resonator 50. An erbium doted glass plate 44 serves as the laser active medium. A saturable absorber 46 is arranged in front of the exit mirror 48 between the exit mirror 48 and the laser active medium 44. A passive Q-switch of the laser is realized by the absorber 46 to generate the laser pulses. The pulsed laser radiation 52 exits to the right in FIG. 2. However, it is possible to provide an active Q-switch also.

Figure 3:
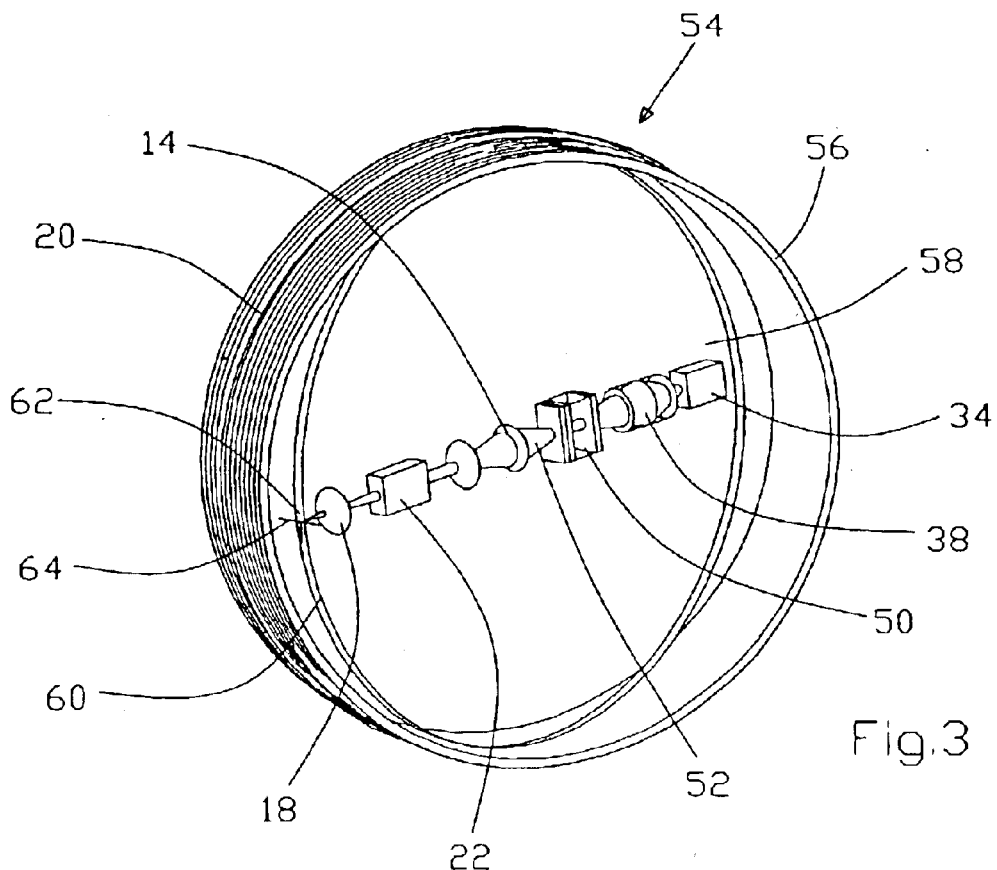
FIG. 3 is a front view of a device for generating a laser beam for a LADAR-transmitter with a cylindrical carrier body
Figure 4:
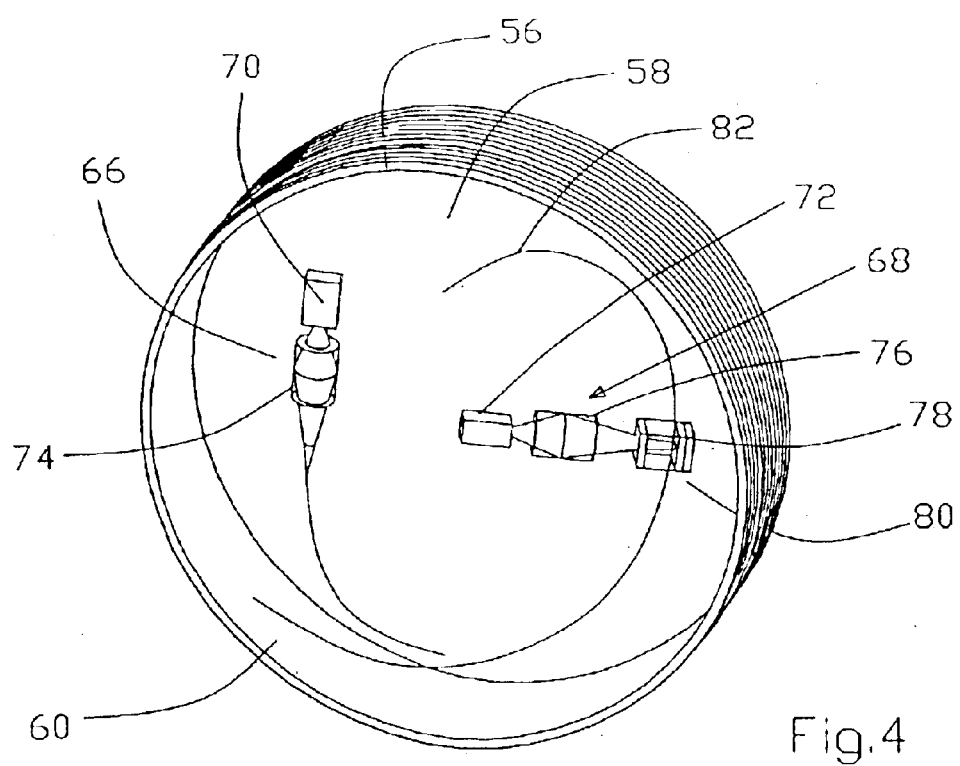
FIG. 4 is a rear view of the device of FIG. 3 1

In FIG. 3 and FIG. 4 a device for generating a laser beam for a LADAR system suitable for a missile is shown. The transmitter 54 comprises a cylinder 56 from a material with a good heat conductivity, whereon the fiber of the fiber optic power amplifier 20 is coiled. The cylinder has an end face 58. The microchip laser 12 with the pump diode 34, lens 38 and resonator 50 described in relation with FIG. 2 is fixed on the front end face 58 shown in FIG. 3. The laser light is collimated by means of the lens 14 as described with reference to FIG. 1 and is guided through the Faraday-insulator. A lens 18 is used for focusing the beam on the coupling of the fiber optic power amplifier. Contrary to FIG. 1 this arrangement is not provided with a dichroitic mirror for coupling in the pump radiation into the fiber optic laser. Here the pump radiation is coupled in by means of a fiber 60 at the first end 62 of the fiber optic power amplifier. A coupling element 64 is used for this purpose. The fiber 60 extends through the end face 58 of the cylinder 56. On the rear side 56 of the carrier body, two pump light sources 66 and 68 are affixed. The pump light sources are diode lasers 70 and 72, respectively, which emit radiation focused by lenses 74 and 76, respectively. The radiation of the diode laser 70 is coupled into the fiber optic power amplifier through the fiber 60 and the coupling element 64 at an end 62. The radiation of the diode laser 72 is coupled through the coupling element 78 at the other end 80 of the fiber optic power amplifier. At this end 80 the output radiation of the fiber laser 20 is also transmitted into the fiber 82. The fiber 82 extends to the tip of the missile (not shown) and transmits the pulsed laser radiation as a transmitter of the LADAR system.

Covers (not shown) are provided for protection of the components. The covers close the S front and rear side of the cylinder and prevent damage and dirt and other influences on the components.

In the present embodiment the carrier 56 is cylindrical with a circular cross section. Thereby the carrier is optimally adapted to the shape of the missile and requires a minimum of space. For increasing the efficiency of the fiber optic power amplifier it is possible, however, to chose a different form of the cross section.

Figure 5:
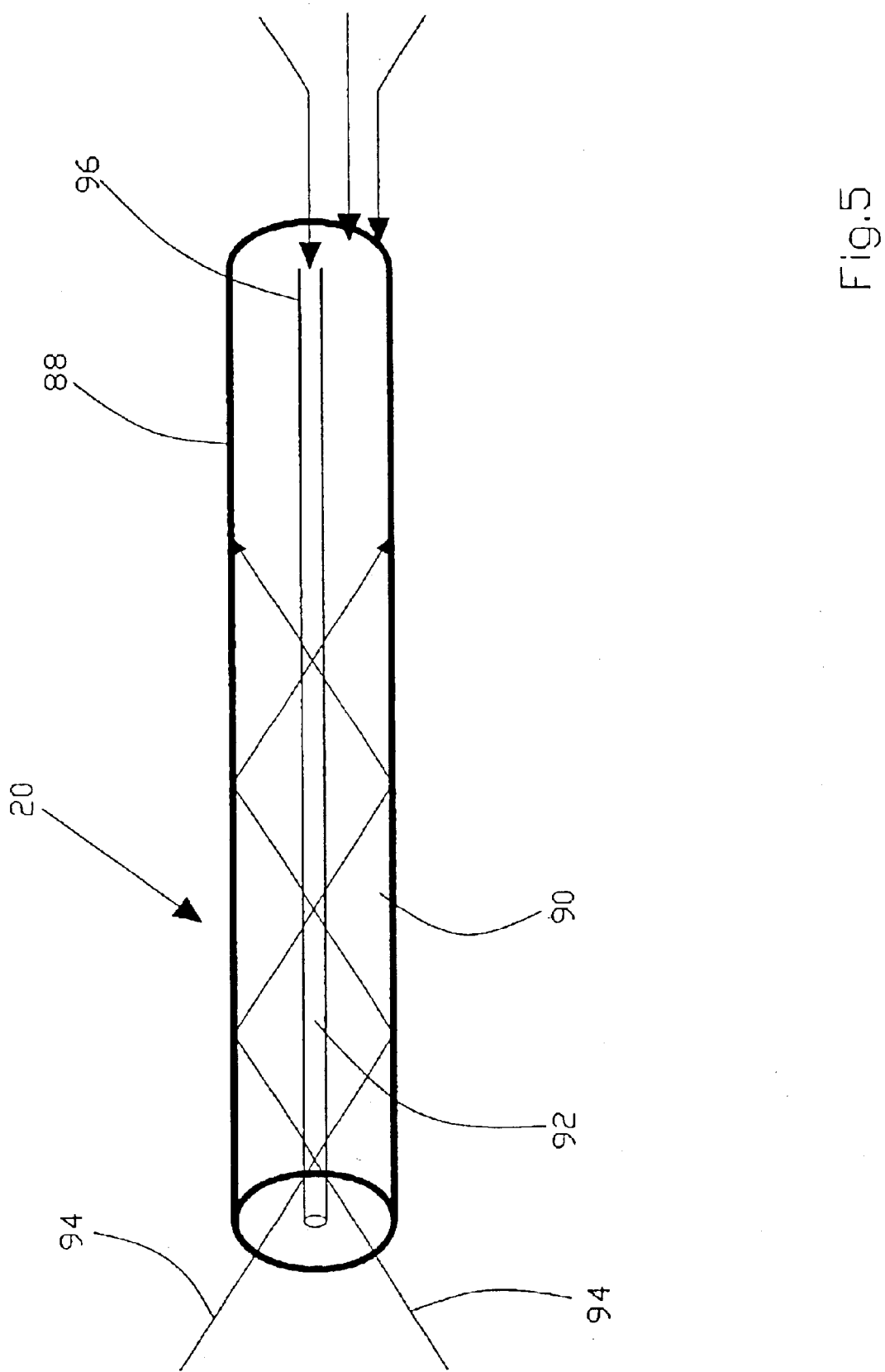
FIG. 5 shows the principle arrangement of a fiber optic laser

In FIG. 5 the constitution of a laser fiber is shown. The fiber used as a fiber optic power amplifier 20 comprises a an outer coating 88 and a laser periphery 90 into which the pump light 94 coupled in from the diodes 70 and 72 is reflected back and forth. Thereby the laser active material in a core 92 of the laser fiber is excited and causes amplification of the reflected laser radiation 96. The fiber can be bent within a permissible tolerance. However, the efficiency of the amplifier is slightly influenced by the degree of bending.

We claim:

1. A device for generating a laser beam in a LADAR system for use in a target tracking missile comprising:
    a master oscillator means comprising a laser active medium for emitting coherent light,
    a fiber optic power amplifier means exposed to said coherent light from said master oscillator means for amplifying the power of said coherent light to provide said LADAR laser beam, said fiber optic power amplifier generating heat,
    said fiber optic power amplifier comprising a pump light source generating pump light, and a length of fiber optic laser-active material,
    a carrier body means of a material exhibiting high heat conductivity, and
    said length of fiber optic material being coiled around said carrier body, said carrier body means being adapted to dissipate said heat generated by said fiber optic power amplifier.

2. A device as claimed in claim 1, wherein said master oscillator is a microchip laser.

3. A device as claimed in claim 1, wherein said pump light source is a diode laser.

4. A device as claimed in claim 1, wherein said carrier body means has a recess therein, and said master oscillator means is accommodated within said recess.

5. A device as claimed in claim 1, comprising at least one further optical component, said carrier body means having a recess therein, said further optical component being accommodated within said recess.

6. A device as claimed in claim 5, wherein said at least one further optical component is said pump light source of said fiber optic power amplifier means.

7. A device as claimed in claim 5, and further comprising cover means for closing said recess.

8. A device as claimed in claim 1, wherein said carrier body means comprise a prismatic body having a circumferential surface, said length of fiber optic material being coiled around said circumferential surface.

9. A device as claimed in claim 8, wherein said carrier body is cylindrical.

10. A device as claimed in claim 8, wherein said carrier body has reniform cross section.

11. A device as claimed in claim 8, wherein said carrier body has elliptical cross section.

12. A device as claimed in claim 1, and further comprising an optical Faraday insulator means between said master oscillator and said fiber optic power amplifier for preventing backscattering and reflection of light from said power amplifier into said master oscillator.

13. A device as claimed in claim 1, and further comprising a dichroitic beam splitter means for coupling radiation from said pump light source into said length of fiber optic laser-active material.

14. A device as claimed in claim 1, and further comprising fiber optic means for coupling said pump light from said pump light source into said length of fiber optic laser-active material.

15. A device as claimed in claim 1, and further comprising fiber optic means for coupling said pump light from said pump light source into said length of fiber optic laser-active material of said fiber optic power amplifier.

16. A device as claimed in claim 15, wherein said length of fiber optic laser-active material of said fiber optic power amplifier is a double-core fiber having a pump core and a laser-active core coaxial within said pump core, said fiber optic means being directly connected to said pump core.

17. A device as claimed in claim 1, comprising transmitter means for directing said LADAR laser beam towards said target, and transmission fiber means for transmitting said LADAR laser beam from said fiber optic power amplifier to said transmitter means.

18. A device as claimed in claim 1, and further comprising a heat conducting paste placed between said coiled length of fiber optic material of said fiber optic power amplifier and said carrier body means to improve heat transmission between said coiled fiber optic material and said carrier body means.

19. A device as claimed in claim 1, wherein said coiled fiber optic material is affixed to said carrier body means by means of a thermally conducting glue.

20. A device for generating a laser beam in a LADAR system for use in a target tracking missile comprising:
    a master oscillator means comprising a laser active medium for emitting coherent light;
    a fiber optic power amplifier means exposed to said coherent light from said master oscillator means for amplifying the power of said coherent light to provide said LADAR laser beam, said fiber optic power amplifier generating heat;
    said fiber optic power amplifier comprising a pump light source generating pump light, and a length of fiber optic laser-active material,
    a carrier body means of a material exhibiting high heat conductivity, said carrier body means having a recess therein, and said master oscillator means having accommodated within said recess; and
    said length of fiber optic material being coiled around said carrier body, said carrier body means being adapted to dissipate said beat generated by said fiber optic power amplifier.

21. A device as claimed in claim 20, wherein said master oscillator is a microchip laser.

22. A device as claimed in claim 20, comprising at least one further optical component, said carrier body means having a recess therein, said further optical component being accommodated within said recess.

23. A device as claimed in claim 22, wherein said at least one further optical component is said pump light source of said fiber optic power amplifier means.

24. A device as claimed in claim 5, comprising cover means for closing said recess.

25. A device as claimed in claim 20, wherein said carrier body means comprises a prismatic body having a circumferential surface, said length of fiber optic material being coiled around said circumferential surface.

26. A device as claimed in claim 25, wherein said carrier body is cylindrical.

27. A device as claimed in claim 25, wherein said carrier body has reniform cross section.

28. A device for generating a laser beam in a LADAR system for use in a target tracking missile comprising:
- a master oscillator means comprising a laser active medium for emitting coherent light;
- a fiber optic power amplifier means exposed to said coherent light from said master oscillator means for amplifying the power of said coherent light to provide said LADAR laser beam, said fiber optic power amplifier generating heat;
- said fiber optic power amplifier comprising a pump light source generating pump light, and a length of fiber optic laser-active material,
- a carrier body means of a material exhibiting high heat conductivity, said carrier body means comprising a prismatic body having circumferential surface, said length of fiber optic material being coiled around said circumferential surface; and
- said length of fiber optic material being coiled around said carrier body, said carrier body means being adapted to dissipate said heat generated by said fiber optic power amplifier.

29. A device as claimed in claim 28, comprising an optical Faraday insulator means between said master oscillator and said fiber optic power amplifier for preventing backscattering and reflection of light from said power amplifier into said master oscillator.

30. A device as claimed in claim 28, comprising a dichroitic beam splitter means for coupling radiation from said pump light source into said length of fiber optic laser-active material.

31. A device as claimed in claim 28, comprising fiber optic means for coupling said pump light from said pump light source into said length of fiber optic laser-active material of said fiber optic power amplifier.

32. A device as claimed in claim 28, wherein said length of fiber optic laser-active material of said fiber optic power amplifier is a double-core fiber having a pump core and a laser-active core coaxial within said pump core, said fiber optic means being directly connected to said pump core.

33. A device as claimed in claim 28, comprising transmitter means for directing said LADAR laser beam towards said target, and transmission fiber means for transmitting said LADAR laser beam from said fiber optic power amplifier to said transmitter means.

34. A device as claimed in claim 28, comprising a heat conducting paste placed between said coiled length of fiber optic material of said fiber optic power amplifier and said carrier body means to improve heat transmission between said coiled fiber optic material and said carrier body means.

35. A device as claimed in claim 28, wherein said coiled fiber optic material is affixed to said carrier body means by a thermally conducting glue.

* * * * *